United States Patent
Ichimiya

(10) Patent No.: US 7,536,094 B2
(45) Date of Patent: May 19, 2009

(54) FOCUS DETECTION APPARATUS AND IMAGE TAKING APPARATUS

(75) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 11/460,434

(22) Filed: Jul. 27, 2006

(65) Prior Publication Data

US 2007/0025716 A1 Feb. 1, 2007

(30) Foreign Application Priority Data

Aug. 1, 2005 (JP) ............................. 2005-222464

(51) Int. Cl.
*G03B 3/00* (2006.01)
*H04N 17/00* (2006.01)
(52) U.S. Cl. ..................... 396/89; 396/125; 348/188
(58) Field of Classification Search ................ 396/89, 396/125–128, 147; 348/175, 188, 345, 347, 348/349, 176, 177, 180
See application file for complete search history.

(56) References Cited

U.S. PATENT DOCUMENTS

| 6,882,369 B1 * | 4/2005 | Ito ............................... 348/345 |
| 7,331,724 B2 * | 2/2008 | Hasegawa et al. ............ 396/348 |
| 2003/0189662 A1 * | 10/2003 | Matsuda ...................... 348/345 |
| 2005/0140813 A1 * | 6/2005 | Wani ...................... 348/333.12 |

FOREIGN PATENT DOCUMENTS

| JP | 9-54242 | 2/1997 |
| JP | 2000-292684 | 10/2000 |
| JP | 2001-004914 | 1/2001 |

\* cited by examiner

*Primary Examiner*—W. B. Perkey
*Assistant Examiner*—Minh Phan
(74) *Attorney, Agent, or Firm*—Fitzpatrick, Cella, Harper & Scinto

(57) ABSTRACT

A focus detection apparatus having a first focus detection unit and a second focus detection unit of a scheme differing from that of the first focus detection unit, for detecting the shift amount of a focal position by the first and second focus detection units, includes (a) an instruction unit capable of instructing a detection mode for detecting the shift amount, and (b) an image producing unit, when given the instructions for the detection mode from the instruction unit, for producing an object image.

8 Claims, 17 Drawing Sheets

CENTER OF FIELD FOR FOCUS DETECTION

CENTER OF FIELD FOR FOCUS DETECTION

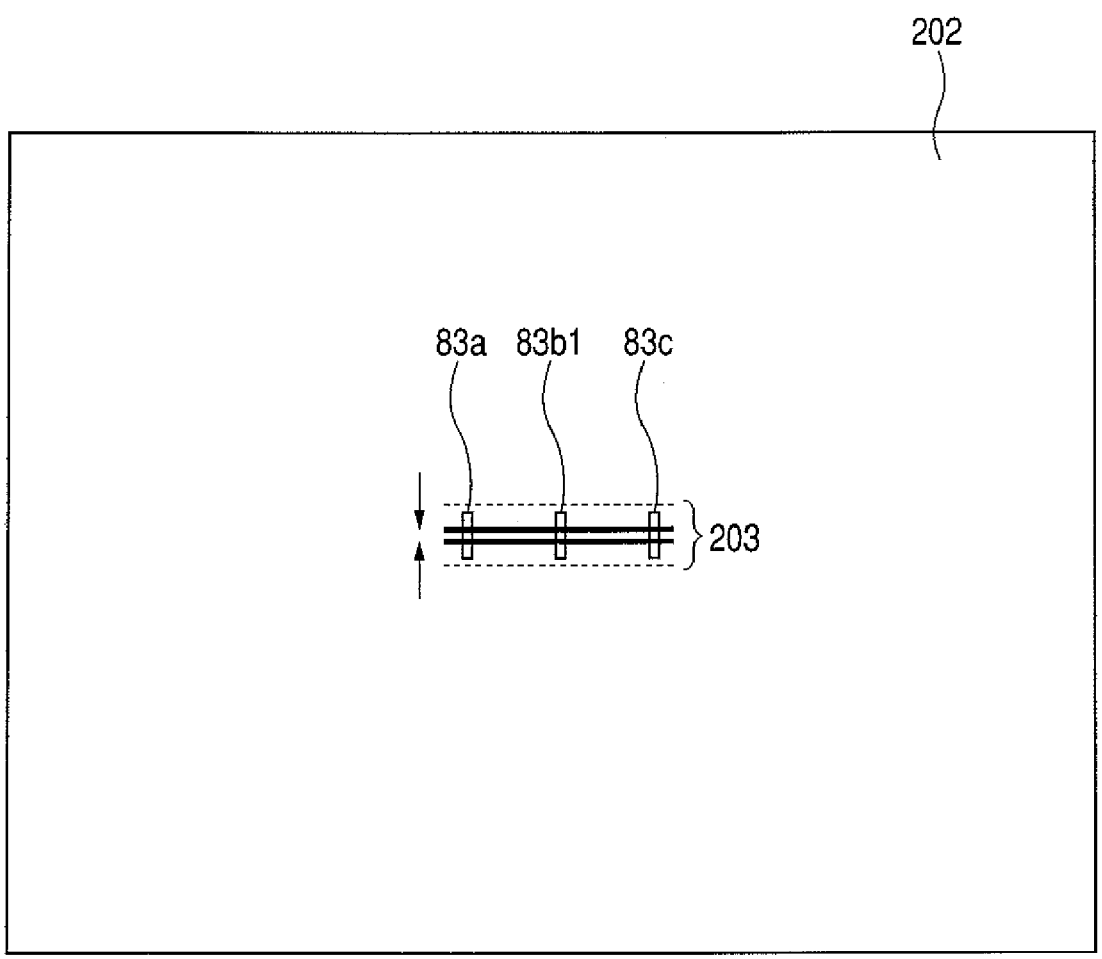

FOCUS DETECTION APPARATUS AND IMAGE TAKING APPARATUS

BACKGROUND OF THE INVENTION

1. Field of the Invention

This invention relates to a focus detection apparatus and an image taking apparatus which are provided with first focus detecting means for detecting a focus shift amount on the basis of the phase difference between a pair of image signals photoelectrically converted by a focus detection sensor, and second focus detecting means for evaluating the contrast of an image signal photoelectrically converted by an image pickup sensor to thereby detect a focus shift amount.

2. Description of the Related Art

As an automatic focus detection apparatus for a camera, there is well known an automatic focus apparatus of a so-called phase difference detection manner for causing light beams from an object passed through different exit pupil areas of a photo-taking lens to be imaged on a pair of line sensors, and finding the displacement amount of the relative position of a pair of image signals obtained by photoelectrically converting the object images, to thereby detect the defocus amount of the object and effect the driving of the photo-taking lens on the basis thereof (Japanese Patent Application Laid-open No. H09-054242 (see FIG. 3)).

Also, in a digital still camera using an image pickup element, there is well known an automatic focus apparatus of a so-called contrast detection manner for detecting an in-focus position by effecting the evaluation of the contrast of an object image obtained by the image pickup element while changing the focal position of a photo-taking lens (Japanese Patent Application Laid-open No. 2001-004914 (see FIG. 1)).

Also, in an image pickup apparatus provided with both of the above-described phase difference detection manner and contrast detection manner, there is known an image pickup apparatus which stores the difference between an in-focus position detected by the phase difference detection manner and an in-focus position detected by the contrast detection manner, in advance, as a correction value, and drives a photo-taking lens from the in-focus position detected by the phase difference detection manner and the stored correction value during ordinary photographing (Japanese Patent Application Laid-open No. 2000-292684 (see FIG. 14)).

The automatic focus apparatus of the phase difference detection manner disclosed in the above-mentioned Japanese Patent Application Laid-open No. H09-054242 (see FIG. 3) can detect the defocus amount from a certain focal position to the in-focus position and therefore, the time required for in-focus detection is short. However, an object optical path obtained by the phase difference detection manner and an object optical path when photographing is actually effected differ from each other and therefore, there occurs an error between the in-focus position detected by the phase difference detection manner and the in-focus position on the image pickup surface.

Also, the automatic focus apparatus of the contrast detection manner disclosed in Japanese Patent Application Laid-open No. 2001-004914 (see FIG. 1) detects the focus by the object optical path in photographing and can therefore accurately detect the in-focus position on the image pickup surface. However, it is necessary to effect contrast evaluation calculation while changing the focal position of the photo-taking lens, and this gives rise to the problem that much time is required until the in-focus position is reached.

Also, in the image pickup apparatus disclosed in Japanese Patent Application Laid-open No. 2000-292684 (see FIG. 14), the in-focus position shift detected by the phase difference detection manner can be corrected by the correction value, but an appropriate correction value cannot be detected depending on the condition of an object when the correction value is detected, and this has led to the problem that as the result, an accurate correction value cannot be obtained. This is because when, for example, the contrast of the object is low, the error of the result of the detection by the phase difference detection manner or the result of the detection by the contrast detection manner becomes great.

Also, when use is made of a pseudo-object image for measurement of high contrast (hereinafter referred to also as the chart image), it is very difficult to accurately make the chart image and a focus detection view field coincident with each other, and a right correction value cannot be found.

Thus, the correction value changes in conformity with the measurement condition and therefore, to detect an original right correction value, it is necessary to provide a predetermined measurement condition. However, if in a factory or the like, it is easy to create a predetermined measurement condition, but it is very difficult for an ordinary user to make the predetermined measurement condition.

SUMMARY OF THE INVENTION

It is the object of the present invention to provide a focus detection apparatus and an image taking apparatus which can accurately and simply find a correction value for applying correction to a focus shift amount detected on the basis of the phase difference between a pair of image signals.

In order to achieve the above object, the present invention in a first aspect thereof provides a focus detection apparatus having a first focus detection unit and a second focus detection unit of a scheme differing from that of the first focus detection unit, and for detecting the shift amount of a focal position by the first and second focus detection units, the focus detection apparatus having:

an instruction unit capable of instructing a detection mode for detecting the shift amount; and an image producing unit, when given the instructions for the detection mode from the instruction unit, for producing an object image.

Other features and advantages of the present invention will become apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the present invention and, together with the description, serve to explain the principles of the present invention.

FIG. 16 shows the relation between the focus detection view field and chart image interval in the embodiment of the present invention.

DESCRIPTION OF THE EMBODIMENTS

Preferred embodiments of the present invention will hereinafter be described in detail with reference to the drawings.

Figure 1:
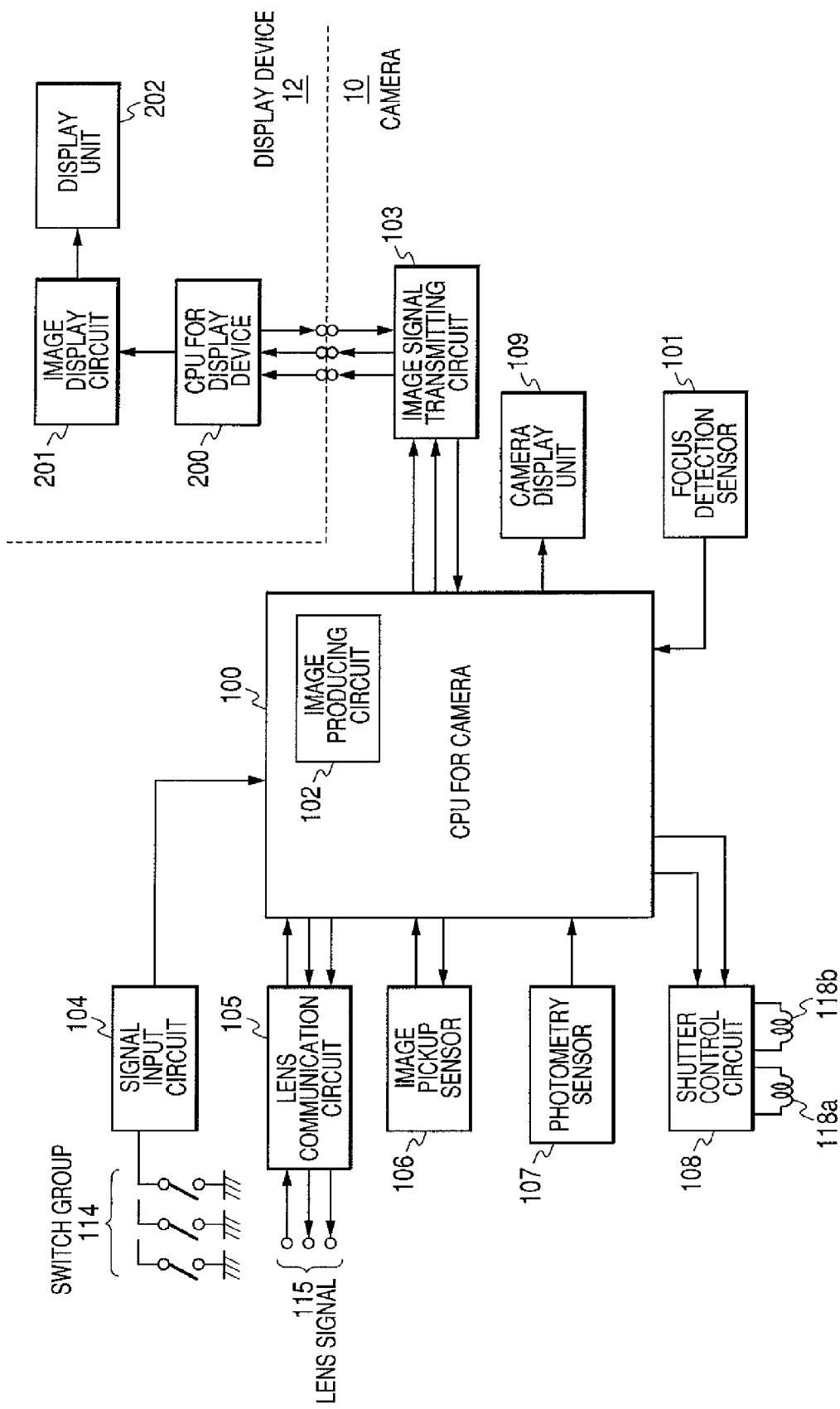
FIG. 1 is a block diagram showing the circuit constructions of a camera and a display device according to an embodiment of the present invention.

FIG. 1 is a block diagram showing the circuit constructions of a camera 10 which is an image pickup apparatus according to an embodiment of the present invention and a display device 12 for displaying a chart image (pseudo-object image) produced during AF (auto focus) calibration. A microcomputer for the camera (hereinafter referred to as the CPU) 100 has connected thereto a signal input circuit 104 for detecting a group of various operating switches 114 of the camera, an image pickup sensor 106, a sensor 107 for photometry, a shutter control circuit 108 for controlling shutter magnets 118a and 118b, a camera side display portion 109 and a focus detection sensor 101. Also, a lens signal 115 is outputted to a photo-taking lens which will be described later through a lens communication circuit 105 to thereby effect the control of a focal position and a stop.

In the CPU 100 for the camera, there is contained an image producing circuit 102 for producing a chart image to be used for AF calibration. The chart image produced by this image producing circuit 102 is transmitted to a CPU 200 for the display device through an image signal communication circuit 103. The CPU 200 for the display device effects the display control of the chart image to a display portion 202 by an image display circuit 201, and effects communication control for transmitting the size information or the like of the display portion to the CPU 100 for the camera, in accordance with instructions from the CPU 100 for the camera.

The CPU 100 for the camera controls the sensor 107 for photometry and the focus detection sensor 101 to thereby detect the brightness of an object, and determine the aperture value of the photo-taking lens, not shown, and a shutter speed. Then, it controls the aperture value through the lens communication circuit 105. Also, it effects the control of the electrical energization time of the shutter magnets 118a and 118b through the shutter control circuit 108, and controls the image pickup sensor 106 to thereby perform a photographing operation. Also, the camera side display portion 109 contained in the camera displays a photographed image, or displays the contents of an alarm or instructions to a user.

In the CPU 100 for the camera, there are contained a ROM (not shown) storing therein a program for controlling the operation of the camera, a RAM (not shown) for storing a variable therein, and an EEPROM (not shown) for storing various parameters therein. The setting of the various modes of the camera is determined by the setting of the switch group 114.

Figure 2:
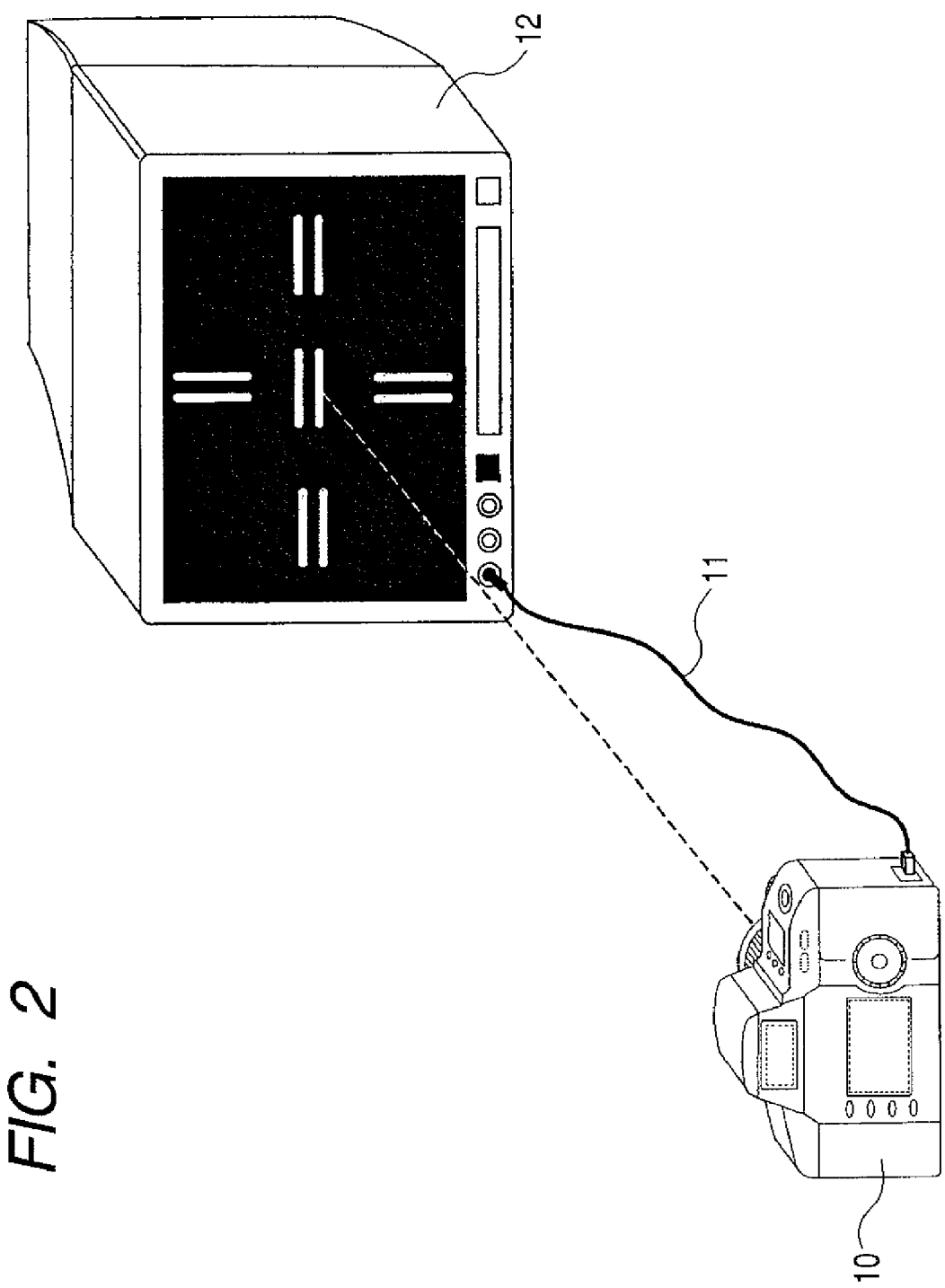
FIG. 2 is a pictorial view showing the state when the camera and display device of FIG. 1 are connected together.

FIG. 2 is a pictorial view showing the state when the camera 10 and display device 12 of FIG. 1 are connected together.

While in FIG. 2, the camera 10 and the display device 12 are connected together by the use of an image communication cable 11, there may be adopted such a construction that an image produced on the camera side is transmitted to the display device by wireless.

Figure 3:
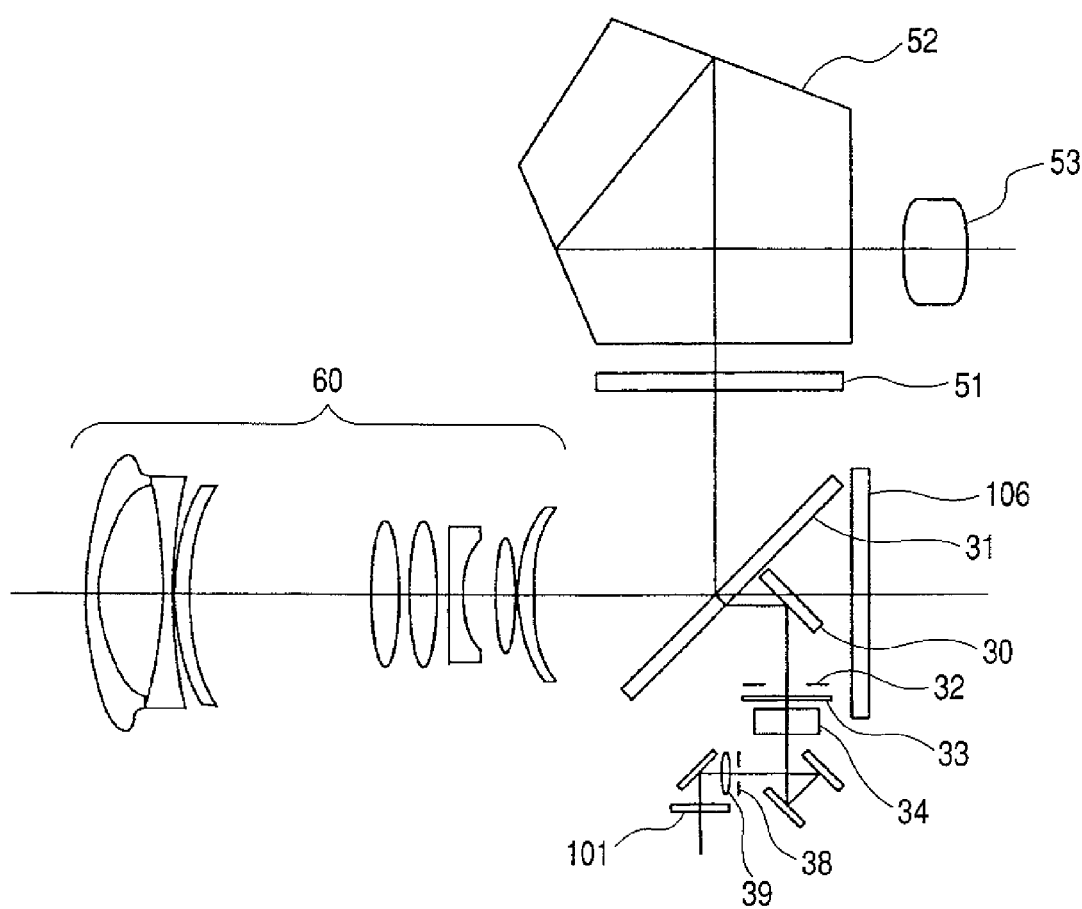
FIG. 3 shows the arrangement of the optical system of the camera of FIG. 1.

FIG. 3 shows the arrangement of the optical system of the camera 10 of the above-described construction.

Most of a light beam from the object incident through the photo-taking lens 60 is upwardly reflected by a quick return mirror 31, and is imaged on a finder screen 51. The user of the camera observes this image through a penta prism 52 and an eyepiece 53. Part of the photographing light beam is transmitted through the quick return mirror 31, is downwardly bent by a sub-mirror 30 behind it, and is imaged on the sensor 101 for focus detection via a view field mask 32, an infrared cut filter 33, a field lens 34, a stop 38 and a secondary imaging lens 39. An image signal obtained by photoelectrically converting this image is processed, whereby the focus state of the photo-taking lens 60 can be detected. In case of photographing, the quick return mirror 31 is jumped up, and the whole light beam is imaged on the image pickup sensor 106, and the exposure of the object image is effected.

The camera in this embodiment is provided with two focus detection manners, and a first focus detection manner is a well-known phase difference detection manner using the sensor 101 for focus detection, and it is possible to detect the focus states of five different areas in an image plane.

Figure 4:
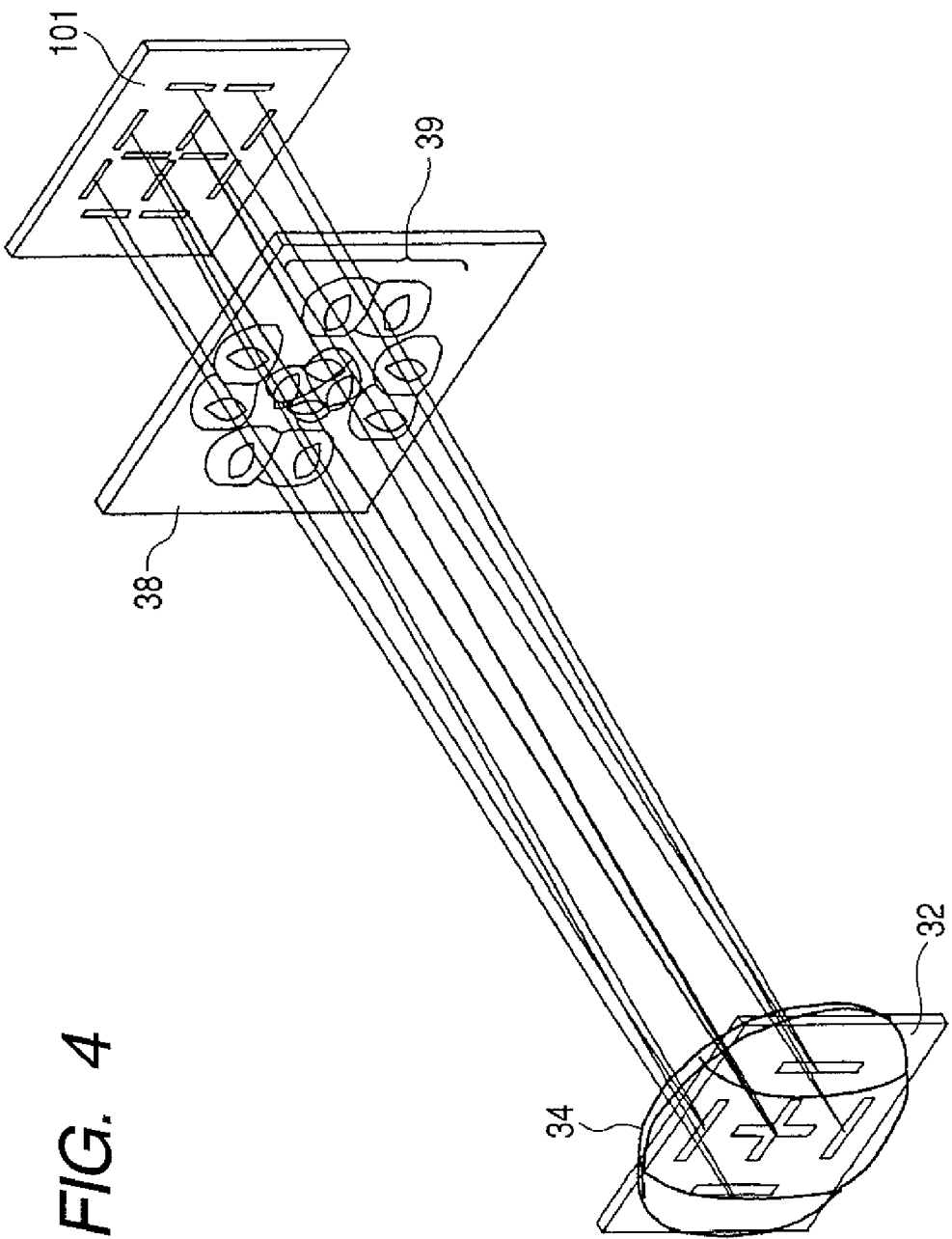
FIG. 4 shows the arrangement of the optical system of a focus detection apparatus of a phase difference detection manner according to an embodiment of the present invention.

FIG. 4 shows the detailed construction of the focus detecting system.

The light beam from the object reflected by the sub-mirror 30 shown in FIG. 3 is once imaged near the view field mask 32 in FIG. 4. The view field mask 32 is a light intercepting member for determining a focus detection area in the image plane, and has a cross-shaped opening portion at the center thereof and four vertically long or horizontally long opening portions around it. The field lens 34 is comprised of three lenses, and a stop 38 is disposed rearwardly thereof, and a vertical pair of opening portions and a horizontal pair of opening portions, i.e., four opening portions in total, are provided in the central portion thereof, and eight opening portions are provided in the peripheral portion thereof.

The field lens 34 has the action of imaging each opening portion of the stop 38 near the exit pupil of the photo-taking lens 60. The secondary imaging lens 39 is disposed rearwardly of the stop 38, and it is comprised of six pairs of lenses, i.e., twelve lenses in total, and the respective lenses correspond to the respective opening portions of the stop 38.

Respective light beams passed through the view field mask 32, the field lens 34, the stop 38 and the secondary imaging lens 39 are imaged on six pairs of, i.e., twelve line sensors on the sensor 101 for focus detection.

Figure 5:
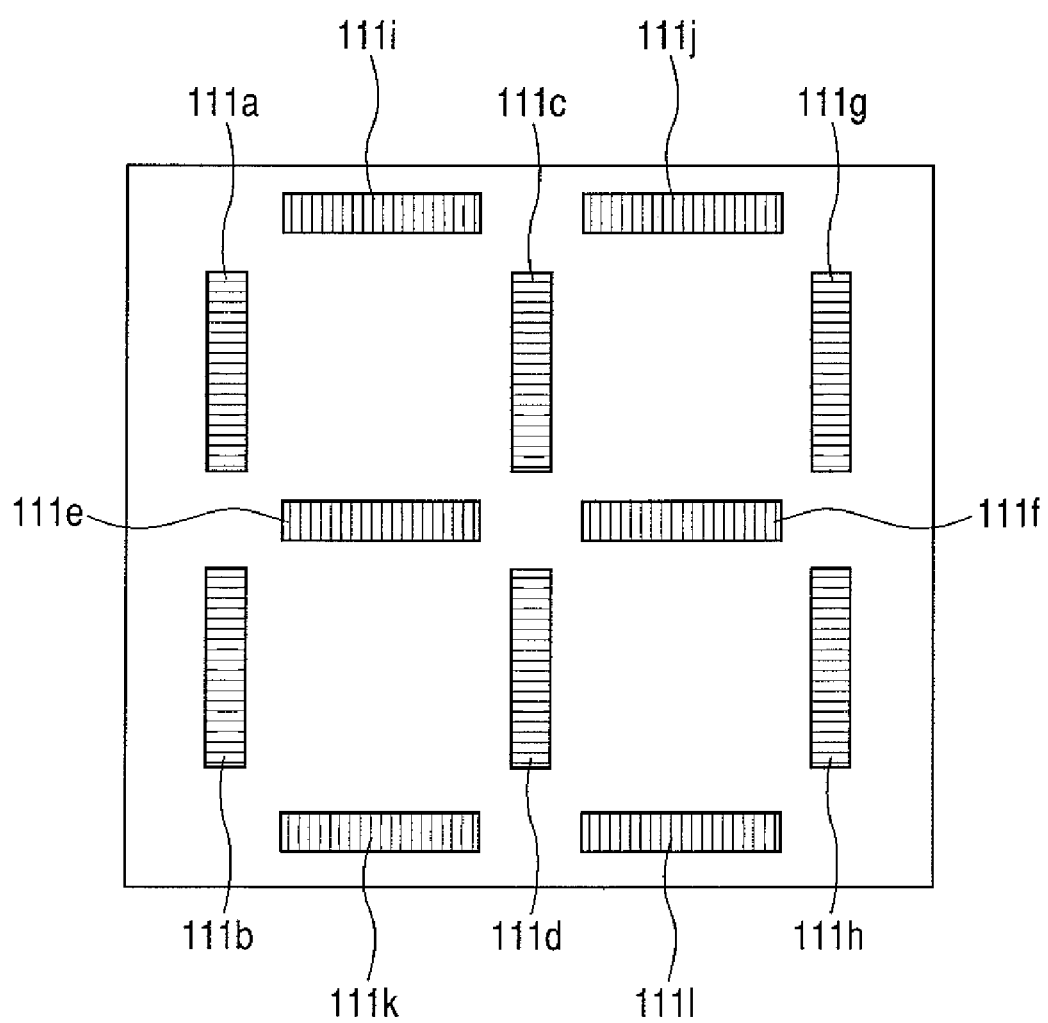
FIG. 5 shows a line sensor provided in the focus detection apparatus of the phase difference detection manner of FIG. 4.
Figure 6:
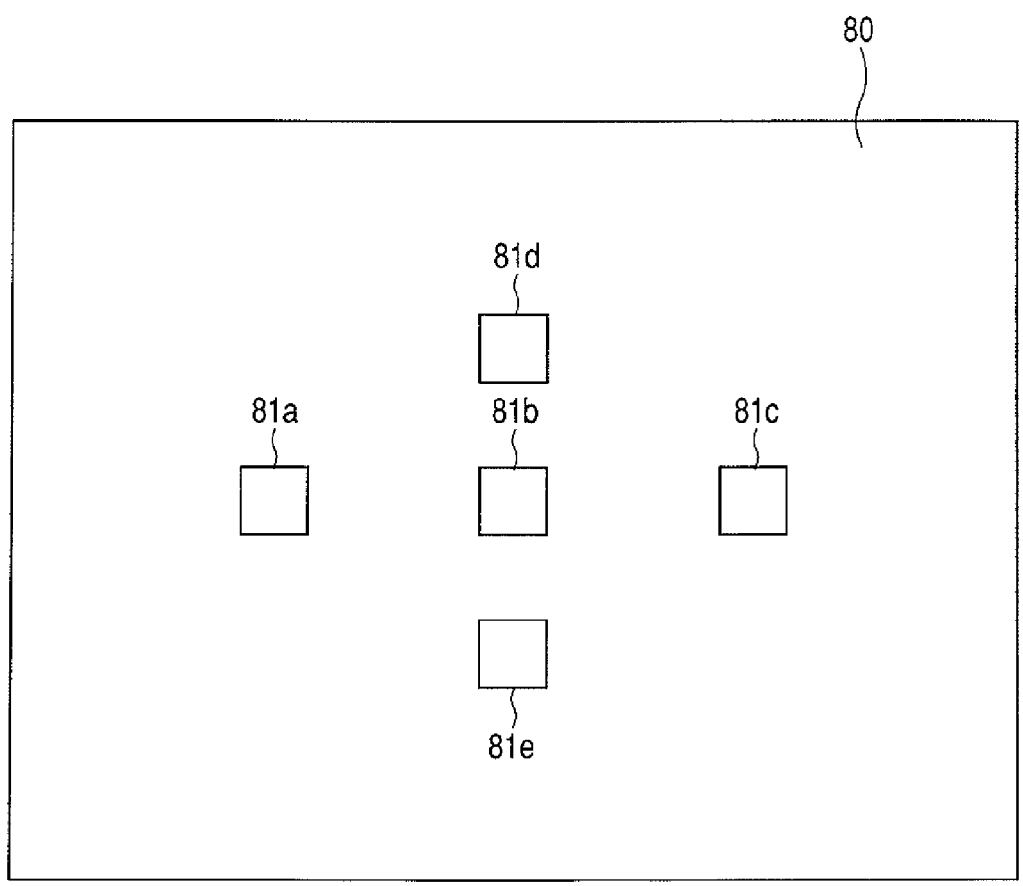
FIG. 6 shows a focus detection frame in the image field of the focus detection apparatus of the phase difference detection manner of FIG. 4.

FIGS. 5 and 6 show the relation between each line sensor and a focus detection frame for defining a focus detection area in the image plane.

A pair of line sensors 111a and 111b shown in FIG. 5 correspond to a focus detection frame 81a in a finder 80 shown in FIG. 6, a pair of line sensors 111c and 111d and a pair of line sensors 111e and 111f shown in FIG. 5 correspond to a focus detection frame 81b shown in FIG. 6, a pair of line sensors 111g and 111h shown in FIG. 5 correspond to a focus detection frame 81c shown in FIG. 6, a pair of line sensors 111i and 111j shown in FIG. 5 correspond to a focus detection frame 81d shown in FIG. 6, and a pair of line sensors 111k and 111l shown in FIG. 5 correspond to a focus detection frame 81e shown in FIG. 6.

The image on each line sensor is photoelectrically converted and the displacement of the relative position of six pairs of image signals is detected, whereby it is possible to detect the focus state with respect to one central range finding point and four peripheral range finding points, i.e., five ranging points in total, on the image plane.

In the present embodiment, hereinafter, the focus detection area by the pair of line sensors 111c and 111d of the focus detection frame 81b is represented as the "central vertical field", and the focus detection area by the pair of line sensors 111e and 111f of the focus detection frame 81b is represented as the "central horizontal view field". Likewise, the focus detection area by the pair of line sensors 111a and 111b of the focus detection frame 81a is represented as the "left vertical view field", the focus detection area by the pair of line sensors 111g and 111h of the focus detection frame 81a is represented as the "right vertical view field", the focus detection area by the pair of line sensors 111i and 111j of the focus detection frame 81d is represented as the "upper horizontal view field", and the focus detection area by the pair of line sensors 111k and 111l of the focus detection frame 81e is represented as the "lower horizontal view field".

Also, a second focus detection manner in this embodiment is a well-known contrast detection manner using an image signal from the image pickup sensor 106, and can detect the focus states of five areas corresponding to the focus detection frames 81a, 81b, 81c, 81d and 81e shown in FIG. 6.

Figures 7, 8:
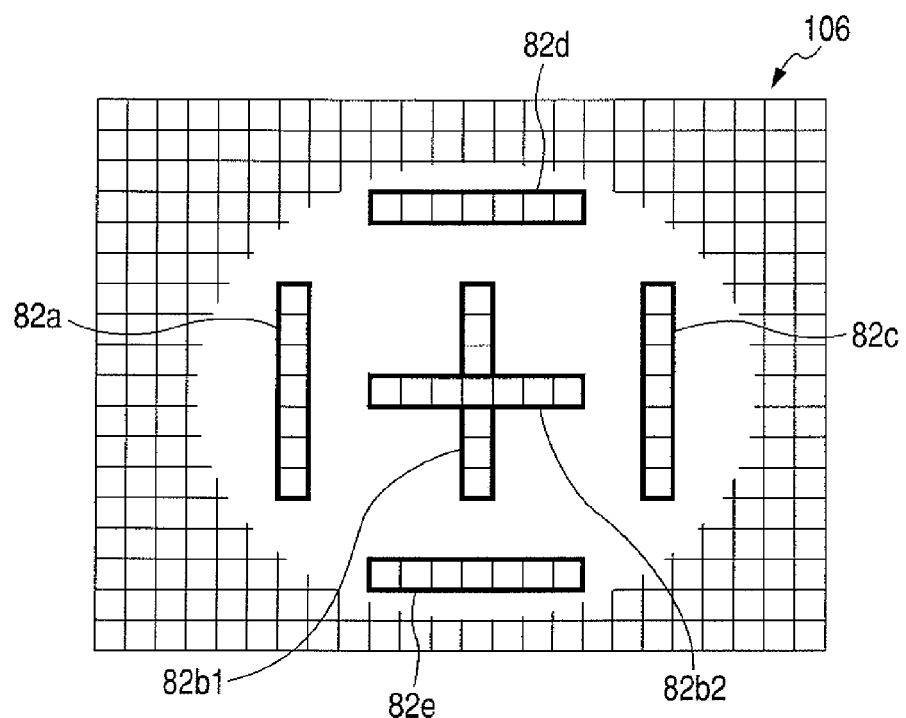
FIG. 7 shows the positional relation between an image pickup sensor according to an embodiment of the present invention and a pixel range for calculating a contrast evaluation value by a contrast detection manner.
FIG. 8 shows an enlarged pixel area corresponding to the central horizontal view field of the focus detection frame 81b of FIG. 7.

FIG. 7 shows the positional relation between the image pickup sensor 106 and a pixel area for effecting contrast calculation. Each frame typically shows each pixel. The pixel area corresponds to each focus detection frame and field for focus detection. That is, the pixel areas 82a, 82b1, 82b2, 82c, 82d and 82e correspond to the focus detection frames 81a, 81b (vertical view fields), 81b (horizontal view field), 81c, 81d and 81e, respectively.

FIG. 8 is an enlarged view of the pixel range corresponding to the horizontal view field of the focus detection frame 81b of FIG. 7. When as shown in FIG. 8, the signals of the respective pixels are represented by S1, S2, ... Sn, the contrast evaluation value can be represented by the following expression:

Contrast Evaluation Value $$\text{Contrast evaluation value} = \sum_{k=1}^{n-1} (S_{k+1} - S_k)^2$$

Figure 9:
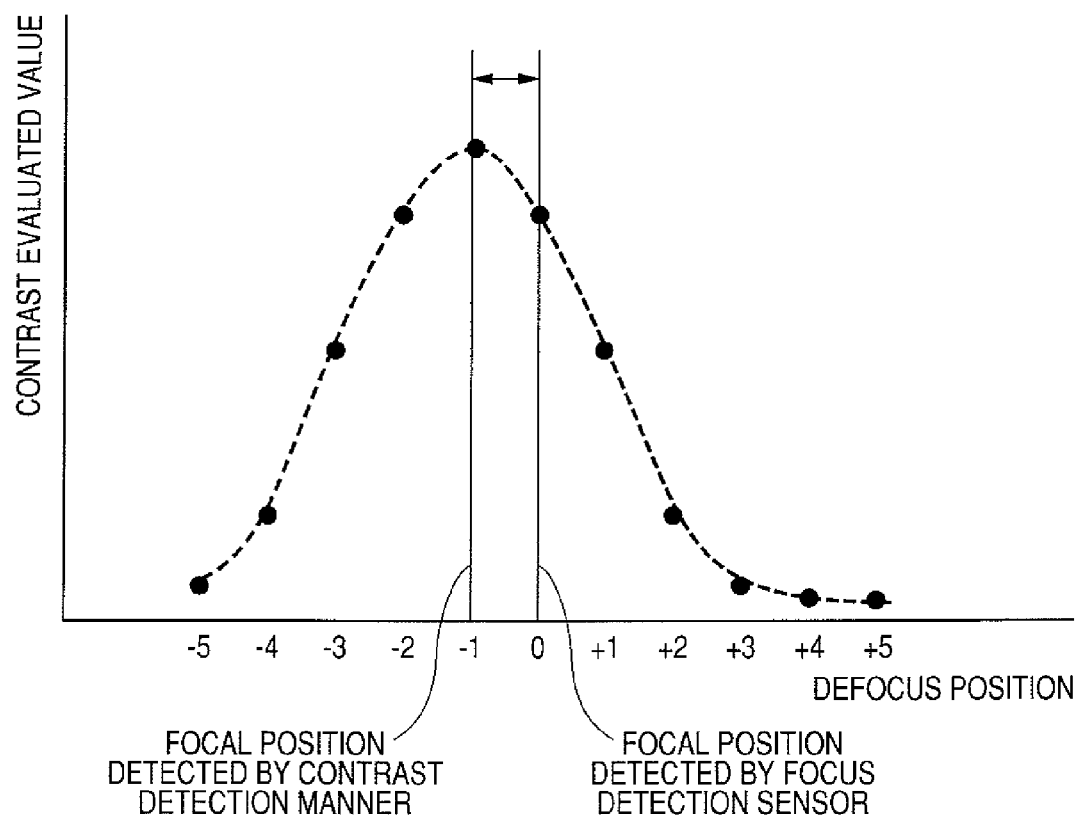
FIG. 9 shows a result obtained by calculating the contrast evaluation value of a signal acquired by the image pickup sensor according to the embodiment of the present invention.

FIG. 9 shows a result obtained by photographing while shifting the focal position from the in-focus position detected by the first focus detection manner which is the phase difference detection manner at predetermined intervals, and calculating the contrast evaluation value from the signal obtained by the image pickup sensor 106, by the above expression.

FIG. 9 shows the result of the contrast evaluation when the focal position has been shifted from the in-focus position detected by the first focus detection manner at predetermined intervals of five points in the longitudinal direction, and in this example, the focal position of −1 is maximum in the contrast evaluation value, and becomes an in-focus position detected in the second focus detection manner.

Also, the difference value between the in-focus position by the first focus detection manner and the in-focus position by the second focus detection manner becomes a correction amount by the first focus detection manner.

The positional relation between the chart image for AF calibration produced by the image producing circuit 102 and the field for focus detection by the first focus detection manner will now be described with reference to FIGS. 10A and 10B.

Figure 10A:
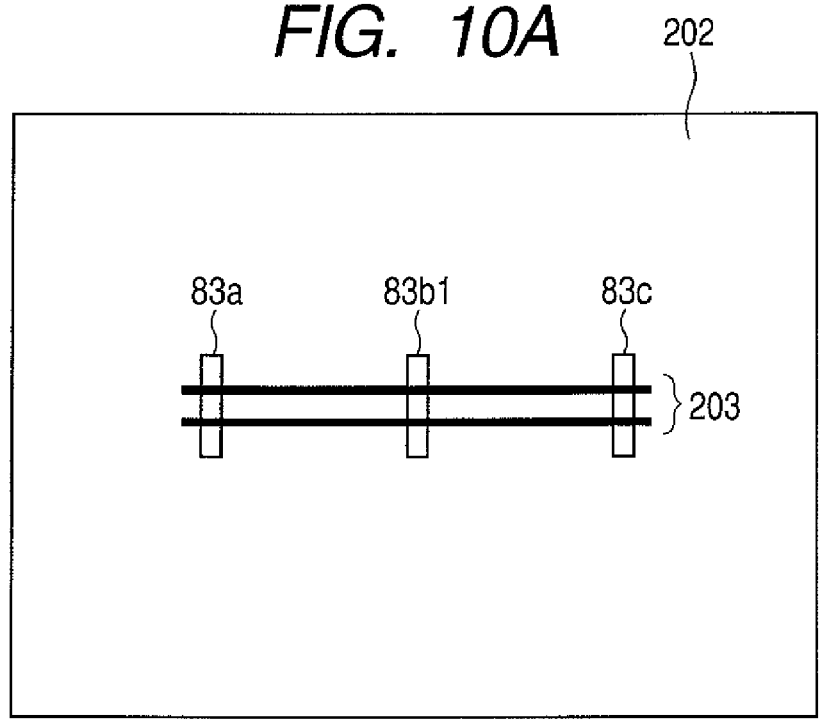
FIGS. 10A and 10B show the positional relation between a focus detection frame in a finder according to an embodiment of the present invention and a chart.

FIG. 10A shows a state in which a horizontal line chart image 203 is produced by the image producing circuit 102, and is displayed on the display portion 202 of the display device side so as to be orthogonal to the left vertical view field 83a of the focus detection frame 81a, the central vertical view field 83b1 of the focus detection frame 81b and the right vertical view field 83c of the focus detection frame 81c. On the other hand, FIG. 10B shows a state in which a vertical line chart image 204 is produced by the image producing circuit 102, and is displayed on the display portion 202 of the display device side so as to be orthogonal to the central horizontal view field 83b2 of the focus detection frame 81b, the upper horizontal view field 83d of the focus detection frame 81d and the lower horizontal view field 83e of the focus detection frame 81e.

Thus, the image producing circuit 102 changes over the chart image correspondingly to the orientation of the view field in which focus detection is effected and therefore, it becomes possible to effect focus detection always at high contrast.

Figure 10B:
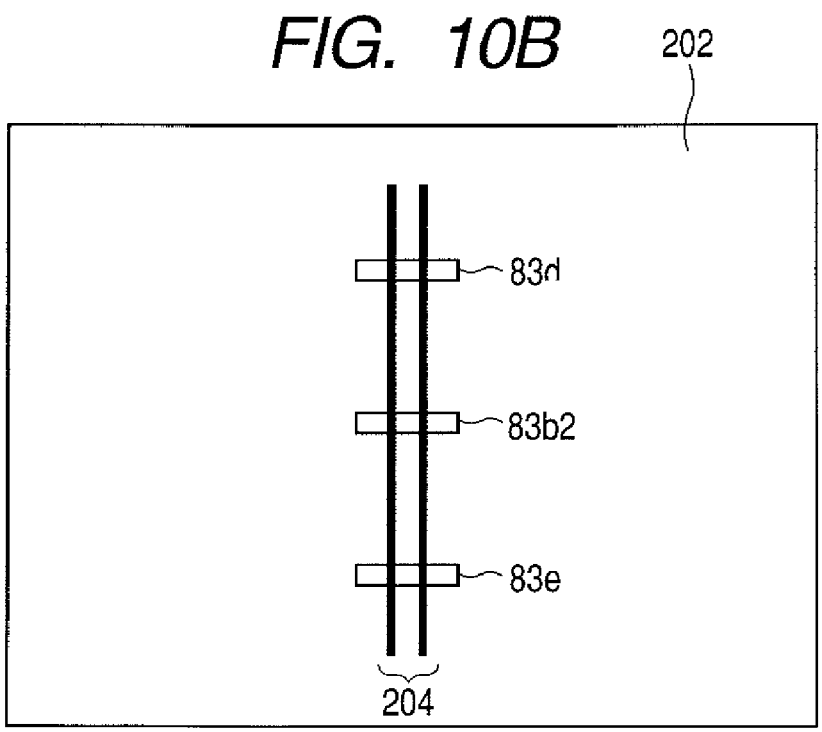

Also, in FIGS. 10A and 10B, the chart image is depicted in black and the others are depicted in white, but actually, the chart image is depicted in white and the others are depicted in black. Further, the color of the chart image can be changed over to other colors than white, and can also be displayed, for example, in red, green or blue.

The operations of the portions of the camera and the display device for displaying the chart image constructed as shown in FIG. 1 which are concerned with the present invention will now be described in detail with reference to the flow charts of FIGS. 11 and 12.

First, at a step S1001, the CPU 100 for the camera judges whether the camera mode has been set from the state of the switch group 114 to an AF calibration mode. If the camera mode is set to the AF calibration mode, advance is made from the step S1001 to the operation of a step S1003. On the other hand, if the camera mode is set to a mode other than the AF calibration mode, advance is made from the step S1001 to the operation of a step S1002, and a camera operation conforming to that mode is executed.

When advance is made to the step S1003 on the assumption that the AF calibration mode is set, the CPU 100 for the camera effects communication with the CPU 200 for the display device through an image signal communication circuit 103, and judges whether the camera and the display device are correctly connected together. If they are correctly connected together and communication can be done normally, advance is made to the operation of the next step S1004. If the communication is abnormal, return is made to the operation of the step S1001.

At the step S1004, the CPU 100 for the camera judges from the state of the switch group 114 whether a start button for starting the AF calibration has been depressed. If the start button is depressed, advance is made to the operation of a step S1005. If the start button is not depressed, return is made to the operation of the step S1001.

At the step S1005, the CPU 100 for the camera communicates with the CPU 200 for the display device to thereby acquire the information of a display size on the display device. While here, the information of the display size is acquired by communication, the display size may be inputted by the user's operation of the switch group 114 to thereby acquire the information. At the next step S1006, the CPU 100 for the camera communicates with the photo-taking lens 60 to thereby acquire the focal length information of the photo-taking lens 60. At the subsequent step S1007, the distance information from the camera to the display device is acquired.

Here, description will be made of an example of the acquirement of the distance information from the camera to the display device. The CPU 100 for the camera requires the user to input the distance from the camera to the display device. Here, the contents of the requirement are displayed on the camera side display portion 109 provided on the camera. By seeing this display, the user operates the switch group 114 to thereby input the distance from the camera to the display device. Thereby, the CPU 100 for the camera can acquire the distance information.

Turning back to FIG. 11, at the next step S1008, the CPU 100 for the camera determines the display area of the chart image displayed by the display device, on the basis of the focal length information of the photo-taking lens 60 acquired at the step S1006 and the distance information acquired at the step S1007.

A method of determining the display area of the chart image will now be described with reference to FIGS. 13A and 13B.

Figure 13A:
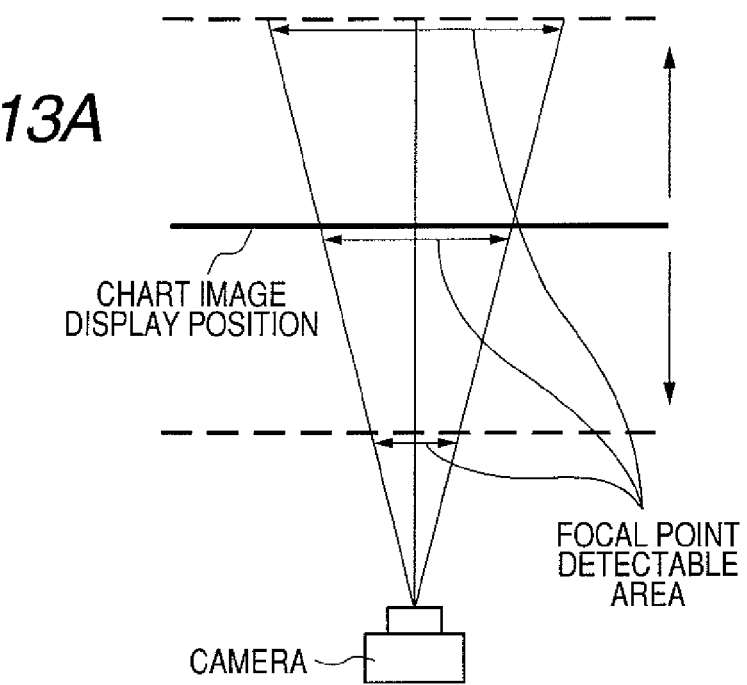
FIGS. 13A and 13B show the relations among the distance from the camera of FIG. 1 to the display device, the focal length of a photo-taking lens and a focal point detectable area.

FIG. 13A shows the relation between the distance from the camera to the display device and the focal point detectable area. The focal point detectable area referred to here indicates the area from the left vertical view field to the right vertical view field. The shorter the distance is, the narrower the focal point detectable area becomes, and conversely, the longer is the distance is, the wider the focal point detectable area becomes. The display area of the chart image is determined in accordance with this focal point detectable area.

Figure 13B:
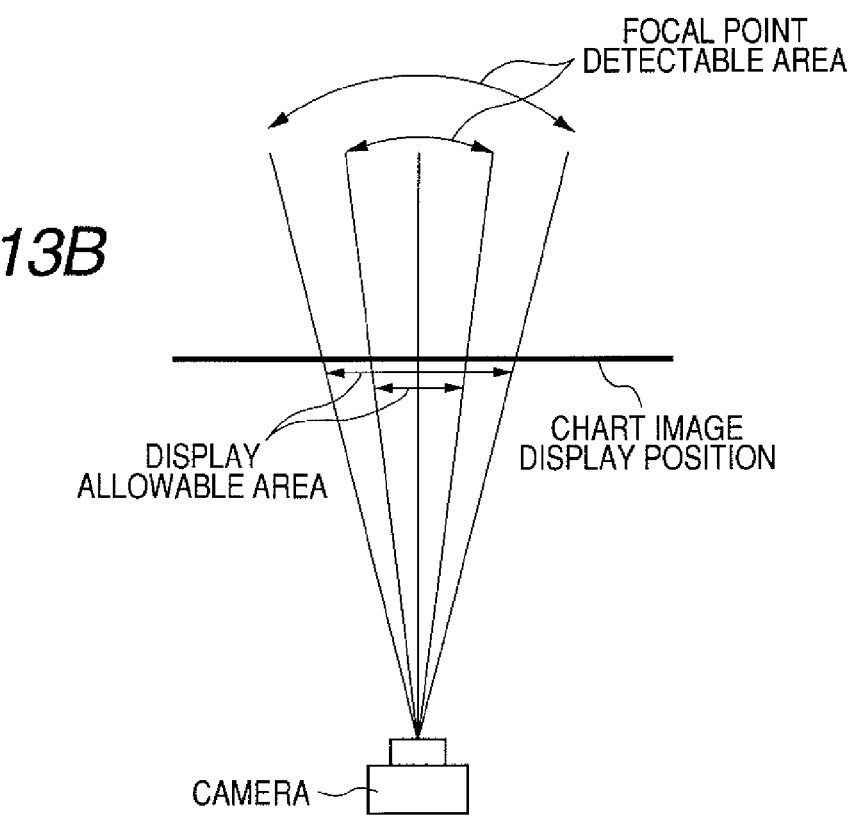

FIG. 13B shows the relation between the focal length of the photo-taking lens 60 and the focal point detectable area. The longer the focal length is and the narrower the angle of view is, the narrower the focal point detectable area becomes, and the narrower becomes also the display area of the chart image. Conversely, the shorter the focal length is and the wider the angle of view is, the wider the focal point detectable area and the wider becomes also the display area of the chart image.

The focal point detectable area of FIGS. 13A and 13B indicates the area from the left vertical view field to the right vertical view field, and the same thing can also be said about the area from the upper horizontal view field to the lower horizontal view field.

As described above, the focal point detectable area is varied by the distance information from the camera to the display device and the focal length information of the photo-taking lens 60. The display area of the chart image is determined so as to be in accord with this focal point detectable area. The display area of the chart image is calculated or measured in advance by the parameters of the distance and the focal length of the photo-taking lens 60, and is stored in a storage portion such as the EEPROM in the CPU 100 for the camera. Alternatively, an expression by which the display area of the chart image can be found from the parameters of the distance and the focal length of the photo-taking lens 60 is stored in advance in storage means such as the EEPROM in the CPU 100 for the camera.

At the next step S1009, the CPU 100 for the camera compares the area of the chart image determined at the step S1008 with the display area of the display device acquired at the step S1005 to thereby judge whether the area of the chart image is within the display area. If the area of the chart image is within the display area, advance is made to the operation of a step S1011. On the other hand, if the area of the chart image exceeds the display area, advance is made to the operation of a step S1010. Then, the CPU 100 for the camera warns the user that the area of the chart image exceeds the display area, or instructs the user to change the distance from the camera to the display device and the focal length.

When advance is made to the step S1011, the CPU 100 for the camera produces a horizontal line chart image by the image producing circuit 102 so as to be capable of being displayed within the display allowable area of the chart image determined at the step S1008. Then, it communicates with the CPU 200 for the display device to thereby display the produced chart image on the display portion 202. At the next step S1012, the position of the chart image is adjusted by a signal from the focus detection sensor 101 so as to be a predetermined position relative to each view field. The intervals of the chart images are also adjusted so as to be a predetermined magnitude.

Here, the adjustment of the position of the chart image will be described with reference to FIGS. 14, 15A and 15B.

Figure 14:
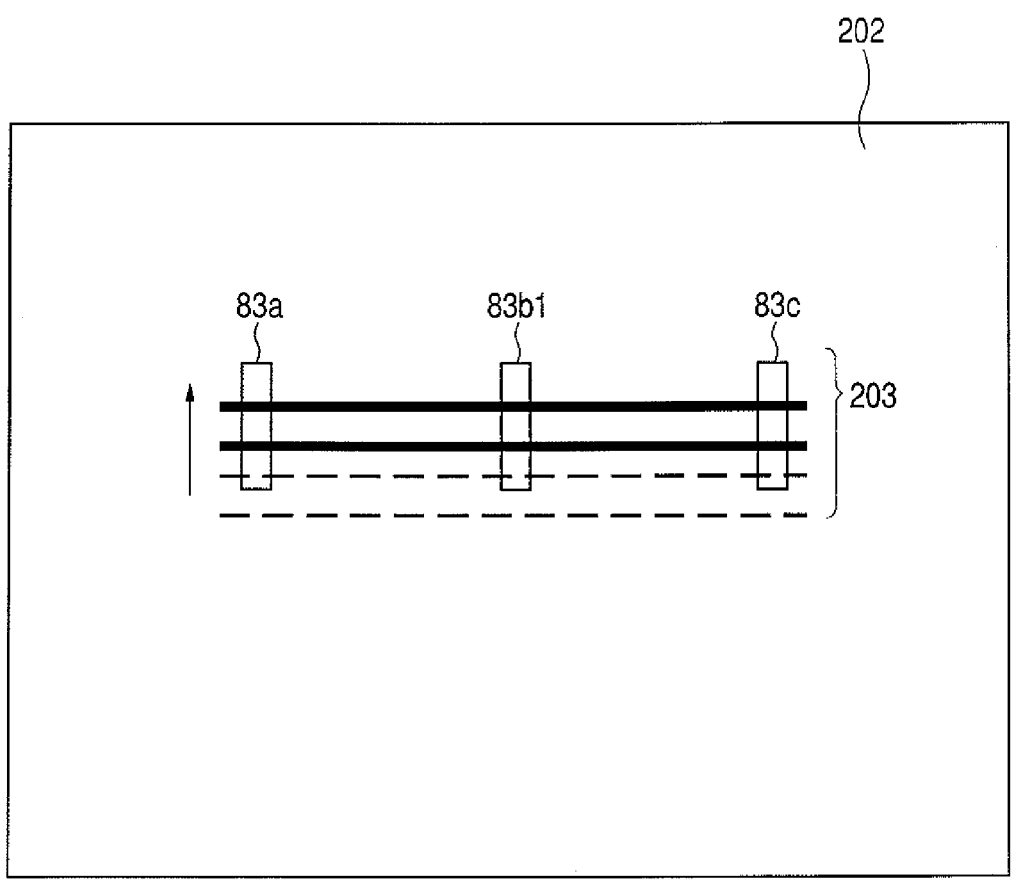
FIG. 14 shows the relation between a focus detection view field and a chart image position in the embodiment of the present invention.
Figure 15A:
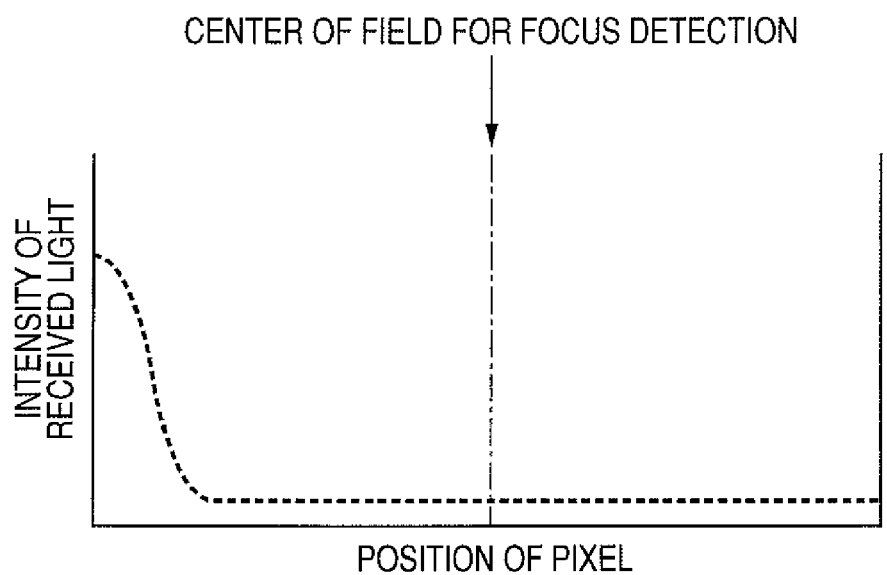
FIGS. 15A and 15B show signal waveforms from the line sensor corresponding to the focus detection view field and chart image position of FIG. 14.
Figure 15B:
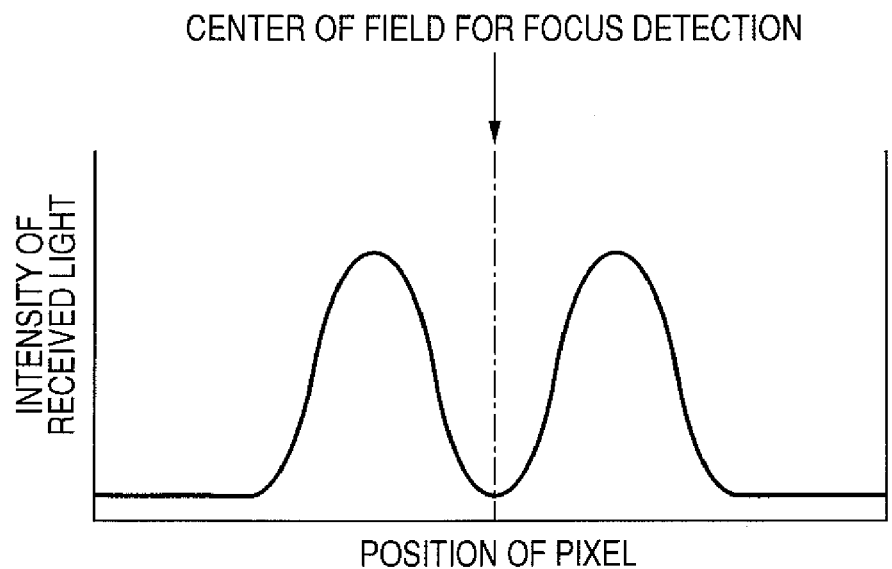

FIG. 14 shows the positional relation among the fields 83a, 83b1, 83c for focus detection and the horizontal line chart image 203. The horizontal line chart image indicated by broken lines deviates a little relative to each field for focus detection. A signal waveform from the line sensor 111a corresponding to the field 83a for a focus detection at this time is shown in FIG. 15A. The horizontal line chart image deviates relative to the center of the field 83a for focus detection and therefore can receive the waveform of the chart image only at the end of the field. The chart image is changed by the image producing circuit 102 so that the waveform of this chart image can be received at the center of the field as shown in FIG. 15B. The adjustment of the chart image is effected so that the chart image may assume the waveform of FIG. 15B, whereby like the horizontal line chart image represented by the solid lines of FIG. 14, it can be located near the center of the field 83a for focus detection.

Figure 17A:
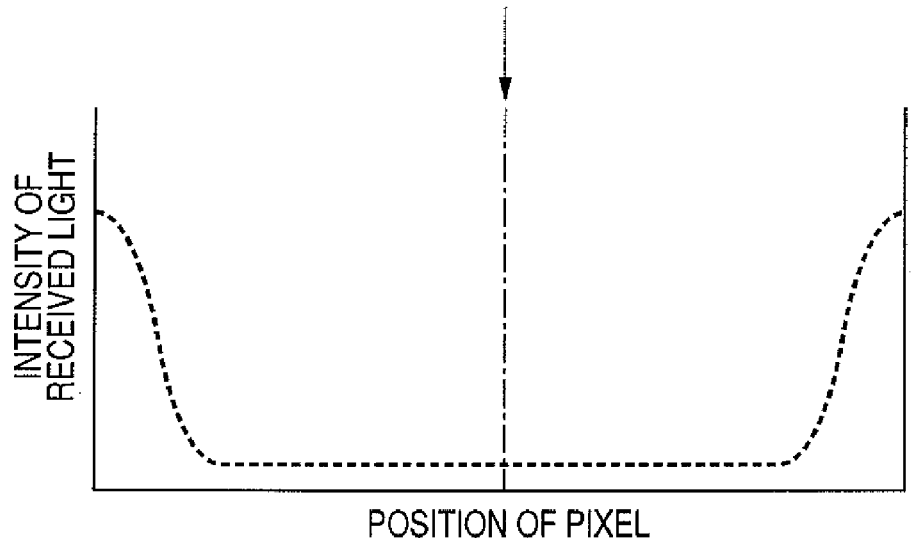
FIGS. 17A and 17B show signal waveforms from the line sensor corresponding to the field for focus detection and chart image interval of FIG. 16.
Figure 17B:
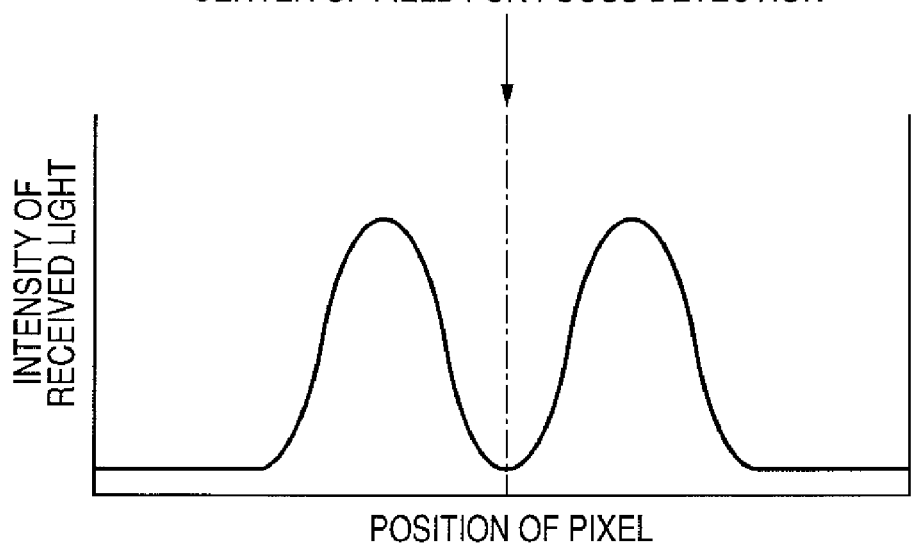

Also, the adjustment of the interval which is one element of the size of the chart image will now be described with reference to FIGS. 16, 17A and 17B.

FIG. 16 shows the positional relations among the fields 83a, 83b1, 83c for focus detection and the horizontal line chart image. The horizontal chart image indicated by broken lines is wide in the intervals of the chart images relative to the fields for focus detection. A signal waveform from the line sensor 111a corresponding to the field 83a for focus detection at this time is shown in FIG. 17A. Since the interval of the horizontal line chart image is wide relative to the field 81a for focus detection, only a part of the horizontal line chart image can be received. The adjustment of the interval of the chart image is effected so that the waveform of this chart image may become the waveform of FIG. 17B, whereby the whole chart image becomes capable of being received by the field 83a for focus detection like the horizontal line chart image represented by solid lines in FIG. 16.

As described above, the position of the chart image and the shift amount (size) of the interval thereof are judged from the signal waveform from the sensor 101 for focus detection, and the chart image is produced by the image producing circuit 102 so that they may become a predetermined position and a predetermined size.

Turning back again to FIG. 11, at the next step S1013, the CPU 100 for the camera performs the operation of measuring and storing a correction value for the result of the focus detection by the phase difference detection manner about the vertical field (the details of this will be described later). At the subsequent step S1014, a chart image is produced by the image producing circuit 102 so that the vertical line chart image may be displayed within the chart display area determined at the step S1008. Then, the CPU 100 for the camera communicates with the CPU 200 for the display device to thereby display the produced chart image on the display portion 202.

At the next step S1015, the CPU 100 for the camera adjusts the position of the chart image by a signal from the focus detection sensor 101 so as to become a predetermined position relative to each view field. Also, the interval of the chart images is adjusted so as to assume a predetermined size. The adjusting method is similar to the operation of the step S1012. At the subsequent step S1016, the operation of measuring and storing a correction value for the result of the focus detection by the phase difference detection manner about the horizontal view field. Then, at a step S1017, the production and display of the chart image by the image producing circuit 102 are completed, thus completing a series of AF calibration operations.

The details of the operation at the step S1013 of FIG. 11 will now be described with reference to the flow chart of FIG. 12.

At a step S2001, the first field for focus detection for effecting AF calibration is selected about the vertical view field. Here, the central vertical view field is selected. Of course, any other field for focus detection than the central vertical view field may be selected. At the next step S2002, about the field for focus detection selected at the step S2001, or a field for focus detection selected at steps S2008 and S2010 which will be described later, the focus detecting operation by the phase difference detection manner is performed from a signal from the focus detection sensor 101. Then, at a step S2003, whether the result of the focus detection by the phase difference detection manner acquired by the operation of the step S2002 is in focus is judged. If it is judged to be in focus, advance is made to the operation of a step S2005. If it is judged to be not in focus, advance is made to the operation of a step S2004.

When it is judged to be not in-focus and advance is made to the step S2004, the driving of a focusing lens is effected by an amount corresponding to the shift amount of the focal point detected at the step S2002, and return is made to the operation of the step S2002.

Figure 18:
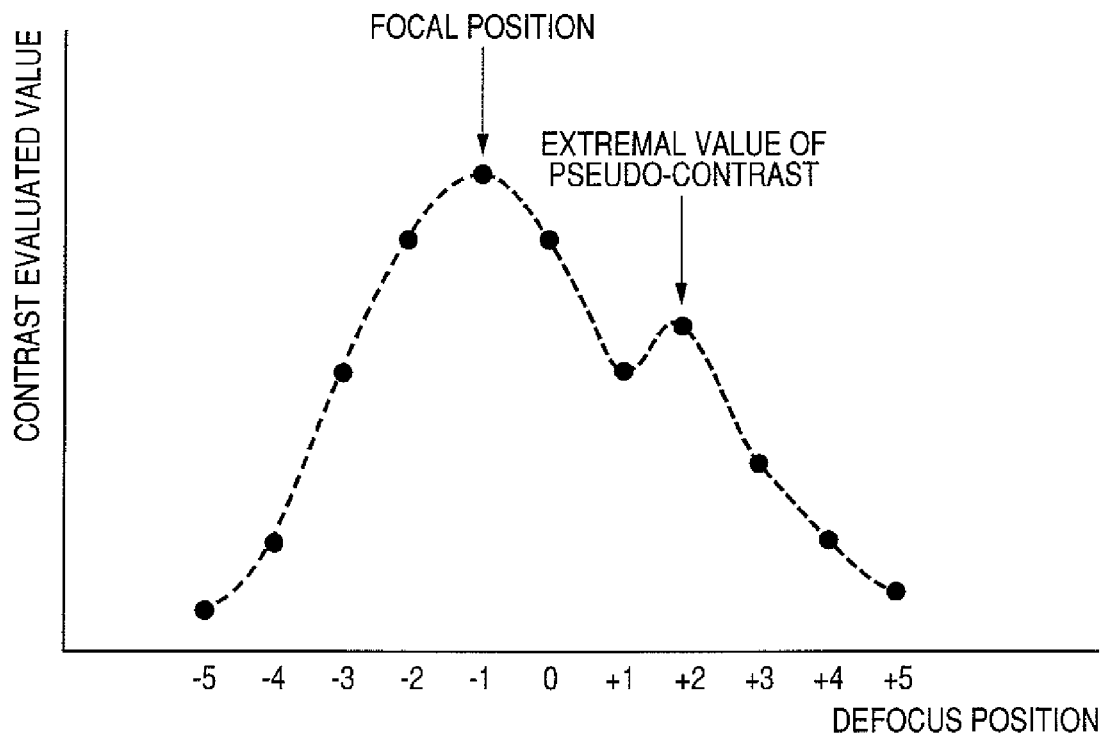
FIG. 18 is a graph for illustrating the focus wrong detection of a contrast detection manner by a pseudo-contrast.

On the other hand, when it is judged to be in focus and advance is made to the step S2005, the focus detecting operation by the contrast detection manner is effected from a signal from the image pickup sensor 106, about the field for focus detection detected by the focus detecting operation of the step S2002 to the step S2004. From the in-focus position detected at the in-focus position by the phase difference detection manner (the steps S2002 to S2004), the in-focus position is detected on the basis of the contrast evaluation value (see FIG. 9) detected in a predetermined focus range and at predetermined intervals. The chart image used for the phase difference detection manner is intactly used also for the focus detection by the contrast detection manner. In the contrast detection manner, however, it is sometimes the case that depending on the defocus position or the spatial frequency of the chart image, as shown in FIG. 18, the extremal value of pseudo-contrast occurs at what is not an original in-focus position and wrong focus detection is effected. This extremal value of pseudo-contrast moves when the spatial frequency of the chart image changes and therefore, when the focus detection by the contrast detection manner is to be effected, the result of the focus detection when the chart image used for the phase difference detection manner has been intactly used is compared with the result of the focus detection when the spatial frequency of the chart image has been changed, and if a difference has come out between the two results, the defocus range to be detected is widened and the original in-focus position is detected.

At the next step S2006, the difference value between the in-focus position by the phase difference detection manner (the steps S2002 to S2004) and the in-focus position by the contrast detection manner (the step S2005) is calculated, and is stored in the EEPROM in the CPU 100 for the camera as a correction value for the focus detection by the phase difference detection manner. At the subsequent step S2007, whether the operation of measuring and storing the correction value (the steps S2002 to S2006) is being performed about the vertical view fields is judged. If the operation of measuring and storing the correction value is being performed about the left side one of the vertical view fields, advance is made to the operation of a step S2009.

Also, if the operation of measuring and storing the correction value is not being performed about the left side one of the vertical view fields, advance is made to the operation of a step S2008. Then, at this step S2008, the left side one of the vertical view fields is selected as a field for focus detection which effects AF calibration, and return is made to the operation of the step S2002.

When advance is made to the step S2009, whether the operation of measuring and storing the correction value (the steps S2002 to S2006) is being performed about the right side one of the vertical view fields is now judged. If the operation of measuring and storing the correction value is being performed about the right side one of the vertical view fields, a series of operations are completed.

Also, if the operation of measuring and storing the correction value is not being performed about the right side one of the vertical view fields, advance is made to the operation of a step S2010. At this step S2010, the right side one of the vertical view fields is selected as a field for focus detection which effects AF calibration, and return is made to the operation of the step S2002.

Figure 11:
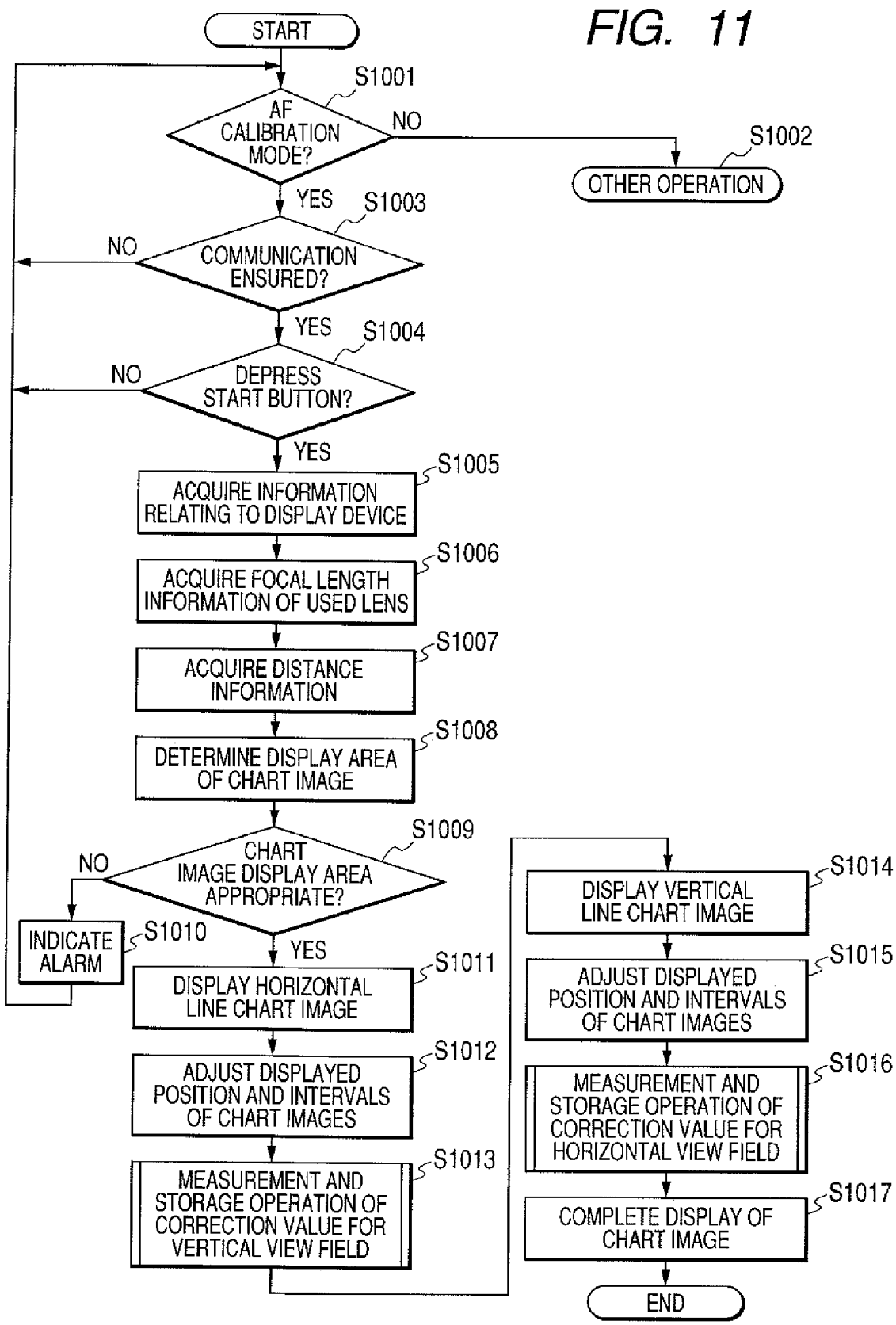
FIG. 11 is a main routine flow chart for illustrating an AF calibration operation in the embodiment of the present invention.
Figure 12:
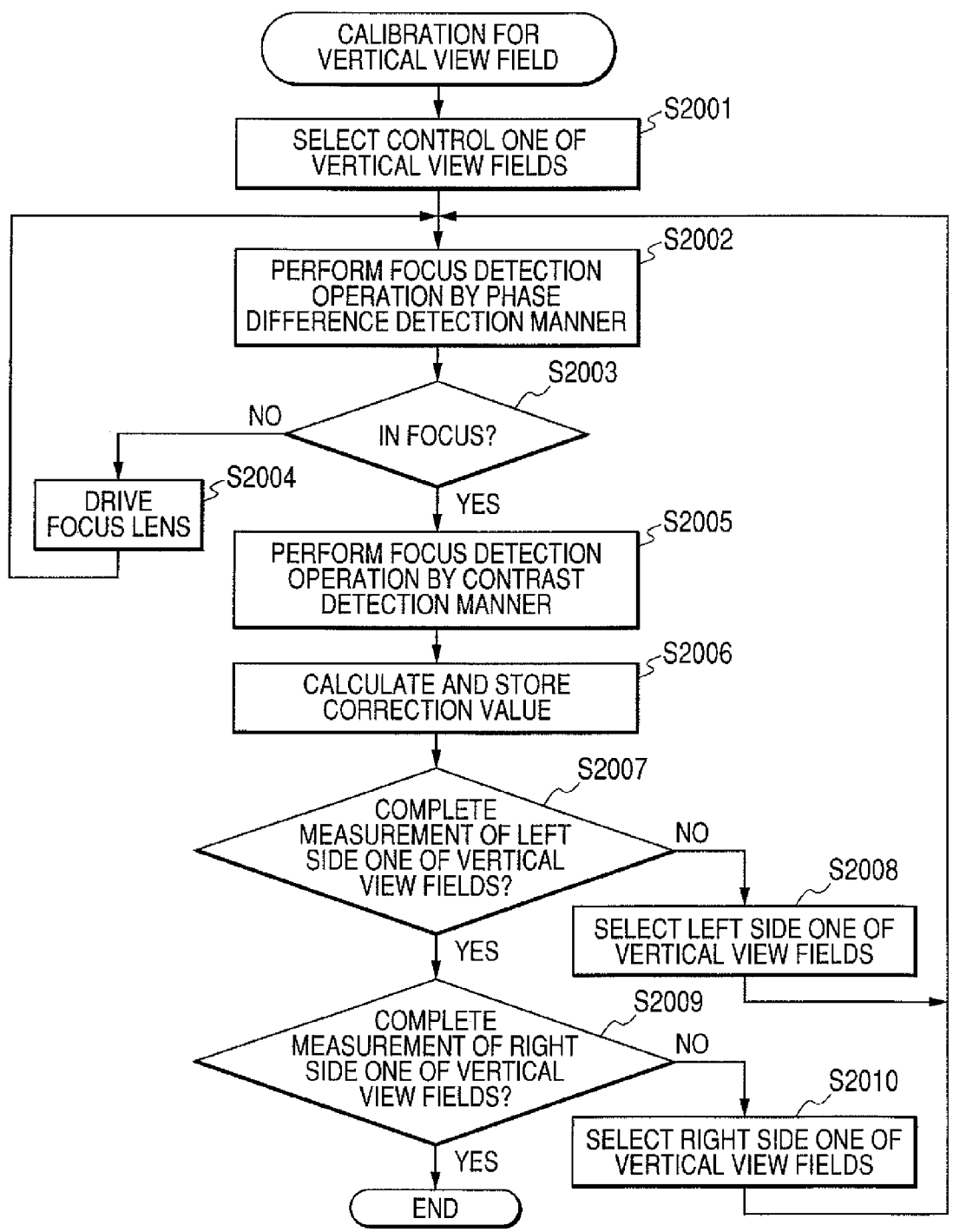
FIG. 12 is a sub-routine flow chart for illustrating the AF calibration operation in the embodiment of the present invention.

At the step S1016 of FIG. 11, the same operation as the flow chart of FIG. 12 is performed by the use of a line sensor forming the focus detection sensor 101 corresponding to the fields for focus detection in the horizontal direction (the central horizontal field, the upper horizontal field and the lower horizontal field), and a pixel area forming the image pickup sensor 106, and this step need not be described here.

As described above, design is made such that a chart image for focus detection used in the AF calibration is produced in the camera and the chart image is displayed by the external display device to thereby find the aforementioned correction value. Consequently, the AF calibration can be effected always by a chart image of high contrast, and a correction value of good accuracy can be acquired.

Also, design is made such that on the basis of the signal waveform from the focus detection sensor 101, the position and size (interval) of the chart image are determined so that the chart image may be in accord with the field for focus detection and therefore, the user's cumbersome work of aligning or the like can be simplified and also, the failure in the AF calibration operation due to the deviation or the like of the positions of the chart image and the field for focus detection can be prevented.

The above-described embodiments are merely exemplary of the present invention, and are not construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

This application claims the benefit of Japanese Patent Application No. 2005-222464 filed Aug. 1, 2005, which is hereby incorporated by reference herein in its entirety.

What is claimed is:

1. A focus detection apparatus having a first focus detection unit and a second focus detection unit of a type differing from said first focus detection unit, for detecting the shift amount of a focal position by said first and second focus detection units, said focus detection apparatus comprising:
   an instruction unit capable of instructing a detection mode for detecting the shift amount; and
   an image producing unit, when given the instructions for the detection mode from said instruction unit, for producing an image for detecting the shift amount of a focal position,
   wherein said image producing unit changes the position and size of the produced image on the basis of the distance information to a display device.

2. A focus detection apparatus according to claim 1, further comprising calculating means for calculating the difference between the result of the detection by said first focus detection unit and the result of the detection by said second focus detection unit.

3. A focus detection apparatus according to claim 1, wherein said image producing unit can change over the orientation of the produced image.

4. An image taking apparatus provided with a focus detection apparatus according to claim 1.

5. A focus detection apparatus according to claim 1, wherein said image producing unit displays the produced image on an outside monitor.

6. A focus detection apparatus according to claim 1, wherein said first focus detection unit detects a focus state on the basis of a contrast of an image signal, and said second focus detection unit detects an in-focus point on the basis of a phase difference detection on a pair of line sensors.

7. A focus detection apparatus having a first focus detection unit and a second focus detection unit of a type differing from said first focus detection unit, for detecting the shift amount of a focal position by said first and second focus detection units, said focus detection apparatus comprising:
   an instruction unit capable of instructing a detection mode for detecting the shift amount; and
   an image producing unit, when given the instructions for the detection mode from said instruction unit, for producing an image for detecting the shift amount of a focal position,
   wherein said image producing unit changes the position and size of the produced image so that the produced image may be obtained near the center of a field for focus detection.

8. A focus detection apparatus having a first focus detection unit and a second focus detection unit of a type differing from said first focus detection unit, for detecting the shift amount of a focal position by said first and second focus detection units, said focus detection apparatus comprising:
   an instruction unit capable of instructing a detection mode for detecting the shift amount; and
   an image producing unit, when given the instructions for the detection mode from said instruction unit, for producing an image for detecting the shift amount of a focal position,
   wherein said image producing unit changes the position and size of the produced image on the basis of acquired image information.

* * * * *